US012410642B2

(12) United States Patent
Schiffer et al.

(10) Patent No.: US 12,410,642 B2
(45) Date of Patent: Sep. 9, 2025

(54) MOTOR VEHICLE LOCK HOUSING ARRANGEMENT

(71) Applicant: Kiekert AG, Heiligenhaus (DE)

(72) Inventors: Holger Schiffer, Meerbusch (DE); Michael Scholz, Essen (DE); Ömer Inan, Dorsten (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 114 days.

(21) Appl. No.: 18/260,269

(22) PCT Filed: Dec. 20, 2021

(86) PCT No.: PCT/DE2021/101021

§ 371 (c)(1),
(2) Date: Jul. 3, 2023

(87) PCT Pub. No.: WO2022/156845

PCT Pub. Date: Jul. 28, 2022

(65) Prior Publication Data

US 2023/0374830 A1 Nov. 23, 2023

(30) Foreign Application Priority Data

Jan. 25, 2021 (DE) ..................... 10 2021 101 502.2

(51) Int. Cl.
*E05B 85/02* (2014.01)
*E05B 77/34* (2014.01)
(Continued)

(52) U.S. Cl.
CPC .............. *E05B 85/02* (2013.01); *E05B 77/34* (2013.01); *E05B 81/64* (2013.01); *E05B 81/04* (2013.01)

(58) Field of Classification Search
CPC .......... E05B 79/02; E05B 77/36; E05B 77/38; E05B 81/14; E05B 81/06; E05B 81/34;
(Continued)

(56) References Cited

U.S. PATENT DOCUMENTS

2002/0109264 A1 8/2002 Lechner
2015/0361694 A1* 12/2015 Zeabari .................. E05B 81/54
361/752

(Continued)

FOREIGN PATENT DOCUMENTS

DE 102015109494 A1 12/2015
DE 112014004455 T5 6/2016

(Continued)

OTHER PUBLICATIONS

International Search Report mailed Apr. 4, 2022, for priority International Application No. PCT/DE2021/101021.

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle lock housing arrangement which is equipped with at least one lock housing and one carrier housing. The lock housing is designed to receive at least one locking-mechanism-side component, such as an actuator. The carrier housing has at least one electronics carrier. The lock housing and the carrier housing are connected together in a media-tight manner. According to the invention, the carrier housing and the electronics carrier define a pre-assembled structural unit, which is coupled modularly to the lock housing with at least one seal interposed.

14 Claims, 3 Drawing Sheets

(51) Int. Cl.
*E05B 81/64* (2014.01)
*E05B 81/04* (2014.01)

(58) Field of Classification Search
CPC .......... E05B 81/54; E05B 81/56; E05B 81/80; E05B 81/82; E05B 81/86
See application file for complete search history.

(56) References Cited

U.S. PATENT DOCUMENTS

| | | | | |
|---|---|---|---|---|
| 2018/0245379 | A1* | 8/2018 | Taurasi .................. | H05K 5/069 |
| 2020/0224464 | A1 | 7/2020 | Cumbo | |

FOREIGN PATENT DOCUMENTS

| | | | | |
|---|---|---|---|---|
| DE | 102019132107 | A1 | 5/2020 | |
| DE | 102019115445 | A1 | 12/2020 | |
| EP | 2754799 | A1 * | 7/2014 | ............. E05B 77/34 |
| EP | 2754799 | B1 | 3/2017 | |
| JP | H08105260 | A | 4/1996 | |

* cited by examiner

MOTOR VEHICLE LOCK HOUSING ARRANGEMENT

This application is a national phase of International Application No. PCT/DE2021/101021 filed Dec. 20, 2021, which claims priority to German Patent Application No. 10 2021 101 502.2 filed Jan. 25, 2021, each of which is hereby incorporated herein by reference in its entirety.

FIELD OF DISCLOSURE

The invention relates to a motor vehicle lock housing arrangement, having at least one lock housing and one carrier housing, wherein the lock housing is configured to receive at least one locking-mechanism-side component, e.g., an actuator, wherein the carrier housing also has at least one electronics carrier, and wherein the lock housing and the carrier housing are connected together in a media-tight manner.

BACKGROUND OF DISCLOSURE

The invention relates to a motor vehicle lock housing arrangement, i.e., a housing arrangement for a motor vehicle lock. The motor vehicle lock in question is generally arranged in or on an associated motor vehicle door, a motor vehicle hatch, etc., but can in principle also be placed, for example, on or in a motor vehicle seat. The motor vehicle lock in question typically interacts with a lock holder mounted on the body. For this purpose, the motor vehicle lock is generally equipped with a locking mechanism consisting of a catch and pawl, which interacts with the lock holder in question in order to releasably connect the motor vehicle door, motor vehicle hatch, and/or the motor vehicle seat to the body, and/or to secure it with respect to the body.

The motor vehicle lock housing arrangement in the generic prior art according to DE 10 2015 109 494 A1 is equipped with a circuit board housing for receiving a circuit board together with its electronics. Moreover, the circuit board housing is coupled to the rest of the lock housing in a liquid-tight manner. This is because, ultimately, a plastic injection-molding connection is realized. As a result, the flexibility is of course limited as regards the design of the electronics carrier including the circuit board housing and/or carrier housing, on the one hand, and the lock housing with the locking-mechanism-side component received therein, on the other. According to the exemplary embodiment in the aforementioned prior art, the locking-mechanism-side component is an actuator by means of which the locking mechanism can be opened. A "locking-mechanism-side component" thus means a component that interacts indirectly or directly with the locking mechanism. The locking mechanism in turn is mounted on a lock plate or a lock case.

The further prior art according to DE 11 2014 004 455 T5 operates with a fluid-tight electrical housing, which comprises electrical components of a lock arrangement. As a result, an entire electrical lock arrangement can be arranged in regions of a motor vehicle door that are exposed to water, grease, or other fluids.

Finally, EP 2 754 799 B1 deals with an electrical vehicle closure which has a first and substantially plate-shaped support body which carries the closure mechanism, and consequently also a locking mechanism. In addition, a further second support body is realized, which in turn arranges a printed circuit board in a position transverse to the plane spanned by the first support body. The second support body has a fluid-tight housing.

The prior art has proven itself in principle as regards the media-tight design of the housing arrangement and/or lock housing and carrier housing. However, in this context, relatively complex designs are proposed which do not permit adaptation to different functional requirements, various installation locations, etc. This is no longer sufficient to meet today's requirements.

SUMMARY OF DISCLOSURE

The invention is therefore based upon the technical problem of further developing such a motor vehicle lock housing arrangement in such a way that a flexible design is made available for realizing different functions and/or attachments at changing installation locations.

In order to solve this technical problem, a motor vehicle lock housing arrangement of the generic type is characterized in the context of the invention in that the carrier housing and the electronics carrier define a pre-assembled structural unit which is coupled modularly to the lock housing, with at least one seal interposed. The lock housing defines, together with the carrier housing, in the assembled state, a housing which is then further combined with the lock case bearing the locking mechanism, accordingly creating the motor vehicle lock, and in particular motor vehicle door lock, as a whole.

In the context of the invention, as before and without modification, the lock housing and the carrier housing consequently join together with a media-tight connection. As a result, the components received and housed in the lock housing and carrier housing, i.e., the locking-mechanism-side component, such as the actuator on the one hand, and the electronics carrier on the other, are accommodated in a protected manner in the interior of the assembled housing composed of the lock housing and the carrier housing. In this case, the housing in question is designed in at least two parts, and, namely, is composed of the lock housing and the carrier housing. In most cases, the housing in question consists of the lock housing and the carrier housing, although further housing parts can also be added in principle. However, in practice, only the lock housing and the carrier housing are typically realized, and are connected to one another in a media-tight manner, and in this way define and determine the assembled housing.

According to the invention, the carrier housing and the electronics carrier then additionally define a pre-assembled structural unit. This structural unit is coupled to the lock housing modularly, with at least one seal interposed. As a result of the modular coupling, the carrier housing and the electronics carrier and/or the pre-assembled structural unit on the one hand, and the lock housing on the other, each define modules or components which are connected to one another via a mechanical interface, which itself is closed in a media-tight manner by means of the seal. The modular character of both the carrier housing and the electronics carrier and/or the associated pre-assembled structural unit as well as the lock housing then allows for the possibility of being able to easily adapt both the carrier housing and/or the electronics carrier and the lock housing to the respective requirements with regard to function and/or mounting location.

For example, the electronics carrier generally has electronic components, which usually and obligatorily comprise a control unit. In addition, one or more sensors can also be provided. Depending upon the functional requirements, it is possible that the electronics carrier in question is additionally equipped with one or more energy sources and/or emergency energy sources. By means of this energy source, an emergency power supply of the actuator can be realized, for example, in order to allow for an electrical unlocking, an electrical opening, etc., of the locking mechanism even in the event of a failure of a vehicle battery.

The energy source or emergency energy source in question may be designed as a battery, capacitor, etc., individually or in combination. If such an "emergency power supply" is not required in a given situation, the electronics carrier and the carrier housing which receives it can be designed differently, and in general in a more compact manner. Nevertheless, due to the modular coupling to the lock housing, the mechanical interface of the structural unit to the lock housing has the same design. In this way, in the example, the same lock housing can be coupled modularly to different pre-assembled structural units consisting of the carrier housing and the electronics carrier, viz., in a first version of the example, with an emergency energy source, and, in a second version, without an emergency energy source. Of course, other variants are also conceivable.

In this way, while adhering to the basic concept of the motor vehicle lock housing arrangement according to the invention, it is possible to take into account both the different functions (with or without emergency energy source) and changing installation/mounting locations. This is because, depending upon the installation space available, e.g., at the installation location, the design of the emergency energy source, with regard to its energy storage capacity, can also be changed in principle. All of this is achieved while maintaining the mechanical interface between the pre-assembled structural unit consisting of the carrier housing and the electronics carrier on the one hand, and the lock housing on the other. Because the interface is closed off with the aid of the at least one seal, the desired media-tight connection between the lock housing and the carrier housing is available, as before and without modification, after its union with the housing.

Since, according to the invention, the lock housing can also be coupled modularly to the structural unit, the lock housing can also be easily adapted to the given, desired function and/or the installation location. Such an adaptation can be carried out, for example, in such a way that the locking-mechanism-side component, e.g., the actuator, is selected and replaceably accommodated in the lock housing according to the specific requirements. It is thus conceivable to design the actuator as an electric motor plus a gearing, or without a gearing. Furthermore, depending upon the forces to be exerted by the actuator, e.g., for opening the locking mechanism, it is possible to work with differently designed gearings (with different ratios).

In this case, too, the modular coupling between the structural unit and the lock housing ensures that the lock housing can be easily and modularly coupled to the structural unit in question while maintaining the mechanical interface to the structural unit, wherein the additionally provided seal ensures the media-tight closure of the mechanical interface in question. That is to say, the mechanical interface of the lock housing to the pre-assembled structural unit is maintained, irrespective of whether the lock housing in the example described receives an actuator with only one electric motor, an actuator with a high gear ratio, an actuator with a low gear ratio, etc., in its interior.

The media-tight coupling between the pre-assembled structural unit and the lock housing, taking into account the preserved mechanical interface, ensures in all cases, and continuously, the media-tight enclosure of both the actuator and the electronics carrier in the assembled housing. Herein lie the essential advantages.

In the context of an advantageous development, the pre-assembled structural unit additionally has a base carrier consisting of the carrier housing and the electronics carrier. The base carrier can be an electrical component carrier, i.e., a carrier for electrical components—for example, for receiving at least one sensor. For this purpose, the electrical component carrier in question typically has inserted or applied electrical conductor tracks. These can also be made available in the form of a punched grid encapsulated by plastic. In any case, the electrical component carrier in turn represents a ready-to-install unit which, in the example, has and carries at least one sensor and makes electrical contact with it.

The design is usually such that the base carrier is arranged between the electronics carrier and the lock housing. As a result, the further possibility exists that the base carrier is coupled to the electronics carrier via an electrical interface. This electrical interface is, for example, an electrical plug connection. For this purpose, the base carrier can be equipped with plug pins, for example, which engage in a plug socket of the electronics carrier for electrical contact. In principle, this can also be reversed. In this case, the electronics carrier has the electrical plug pins in question, which engage in the plug socket on the base carrier. For example, the combination of the base carrier with the electronics carrier ensures the mechanical and electrical connection thereof at the same time.

The base carrier and the electronics carrier are generally arranged together in the carrier housing and are accommodated by the carrier housing. In addition, the design is usually such that the carrier housing, the electronics carrier, and the base carrier in this case define the pre-assembled structural unit, which are modularly coupled to the lock housing, with at least one seal interposed. In this way, the electrical interface is advantageously arranged encapsulated within the structural unit.

In addition, the design is usually such that the sensor carried by the base carrier and/or by the electrical component carrier operates in a contactless manner. In this way, a mechanical connection between the sensor in question on the one hand, and, on the other, for example, the locking mechanism, a lever interacting with the locking mechanism, etc., is not required. In principle, the electronics carrier and the base carrier can also be a single component. Then, for example, a continuous electrical component carrier is used.

Furthermore, the invention recommends that, advantageously and additionally, a lock plate bearing the locking mechanism be provided. The lock plate can in turn be modularly connected to the housing already explained above. As already explained, the housing is generally composed of the carrier housing and the lock housing—in most cases without further components. The housing in question can then also be coupled and/or connected modularly according to the invention to the lock plate. In this case, the housing in question is sealed with respect to the lock plate according to the invention. For this purpose, in most cases, the locking-mechanism-side component is guided in the lock housing to the outside via a seal.

Since the locking-mechanism-side component in the lock housing is usually the actuator, this means that the actuator is guided to the outside with the aid of the seal in question, so that, as a whole, the housing is sealed and can be sealed with respect to the lock plate in this way. This is because the actuator can work on the locking mechanism, viz., taking into account the interposed seal, with the aid of which it is guided out of the housing. As a result, the housing can be designed as a whole in a media-tight manner, and is hermetically sealed.

The "modular connection" between the housing and the lock plate, in turn, expresses and means according to the invention that a standardized mechanical interface is realized between the housing and the lock plate, and is maintained, regardless of the specific design of the housing and/or the lock plate on the one hand and/or the locking mechanism carried by it on the other. It is thus conceivable for the lock plate to be designed in principle to receive locking mechanisms with, for example, differently designed catches and/or pawls, while preserving the mechanical interface to the housing. The housing can also be constructed in various ways—for example, according to whether or not the previously mentioned "emergency power supply" is desired and required as a function.

In contrast to the mechanical interface between the pre-assembled structural unit consisting of the carrier housing, the electronics carrier, and optionally the base carrier and the lock housing, the mechanical interface between the housing and the lock plate is not necessarily equipped with a seal. In fact, such a seal is dispensable in the region of this mechanical interface, because the housing is sealed with respect to the lock plate. That is to say, the housing is hermetically sealed overall with respect to media such as, for example, water, dust, grease, etc. Nevertheless, the locking-mechanism-side component can operate, in the interior of the lock housing, and thus of the housing as a whole, on the locking mechanism carried on the lock plate and mounted thereon. This is achieved because the locking-mechanism-side component in question is guided to the outside of the housing via the seal, and can be brought into engagement with the locking mechanism in the course of the mechanical coupling of the housing to the lock plate.

As a result, a motor vehicle lock housing arrangement is, in the context of the invention, provided which, by virtue of its modular character, makes it possible to adapt to different desired functions within a motor vehicle, as well as to the mounting at different positions and/or taking into account differently designed installation locations. Despite this flexibility, the essential components of the motor vehicle lock housing arrangement according to the invention, viz., for example, the actuator, a control unit, and sensors, are accommodated in a media-tight manner in the housing. Such an embodiment, which is flexible and media-tight at the same time, has hitherto remained without an exemplary model.

BRIEF DESCRIPTION OF DRAWINGS

The invention is explained in greater detail below with reference to drawings which show only one embodiment. In the drawings.

DETAILED DESCRIPTION

Figure 1:
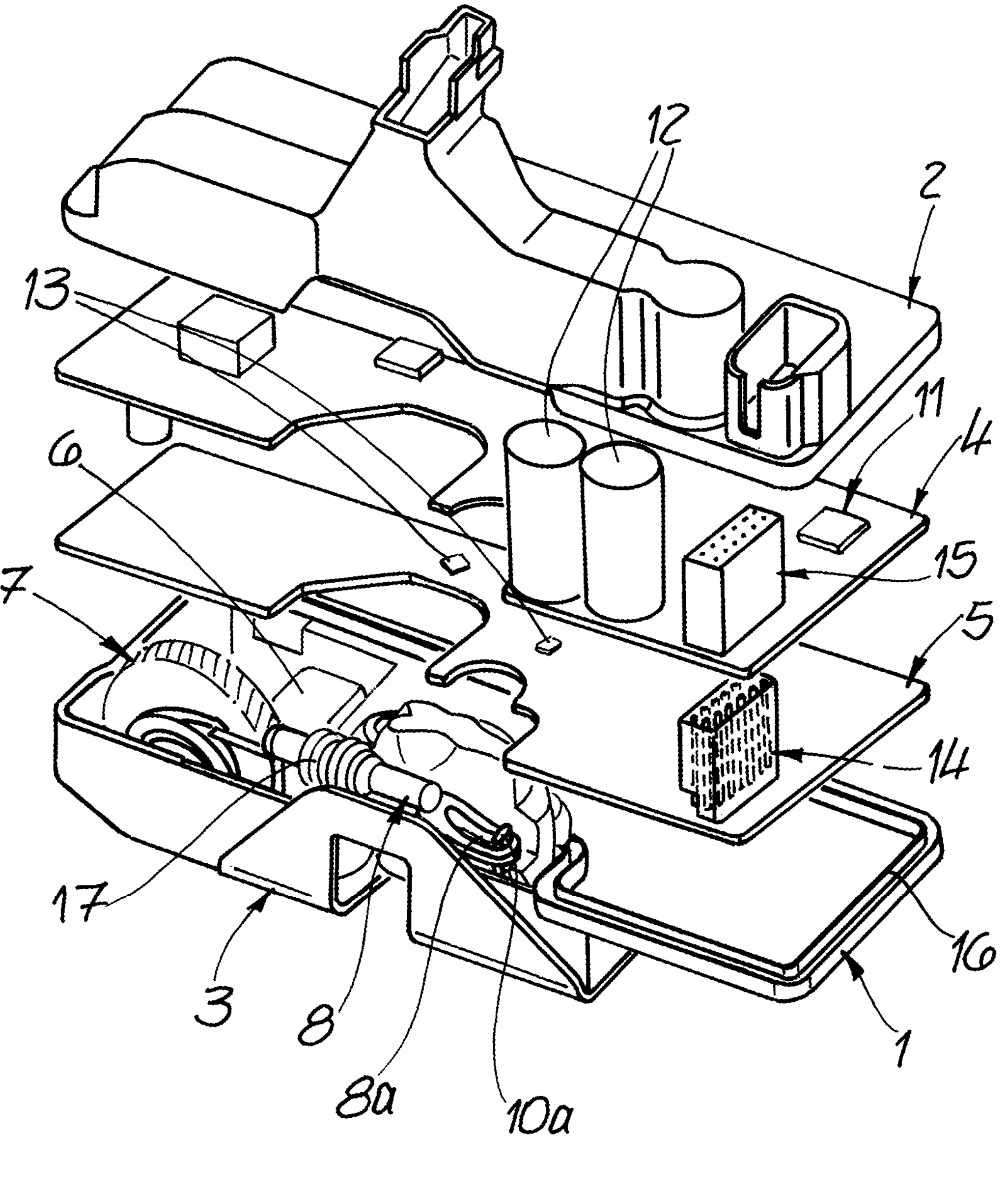
FIG. 1 is a perspectival exploded view of the motor vehicle lock housing arrangement according to the invention.

In the figures, a motor vehicle lock housing arrangement is shown which is composed of a lock housing 1, a carrier housing 2, and a lock plate 3. This can be seen when comparing FIGS. 1 and 3. The lock housing 1 and the carrier housing 2 define, overall, a housing 1, 2 consisting of the lock housing 1 and the carrier housing 2. The housing 1, 2 is in turn brought together and coupled with the lock plate 3 in accordance with the illustration in FIG. 2 to form the motor vehicle lock housing arrangement and/or a motor vehicle lock according to the invention.

For this purpose, the lock housing 1 is designed to receive a locking-mechanism-side component 6, 7, 8, which is an actuator 6, 7, 8. According to the exemplary embodiment, the actuator 6, 7, 8 is composed substantially of an electric motor 6, a gearing 7 acted upon by the electric motor 6, and finally a control lever 8 connected to the output of the gearing 7. According to the exemplary embodiment, the actuator 6, 7, 8 works on a locking mechanism 9, 10, mounted in or on the lock plate 3, with a catch 9 and pawl 10.

Specifically, when the actuator 6, 7, 8 and/or the electric motor 6 is energized, the control lever 8 ensures that the pawl 10 is lifted from its engagement with the catch 9. For this purpose, the control lever 8 is equipped on the front side with an engagement opening 8*a*, into which an actuating pin 10*a* on the pawl 10 engages as soon as the housing 1, 2 is coupled to the lock plate 3 and the locking mechanism 9, 10 mounted thereon.

It can be seen from FIG. 1 that the carrier housing 2 receives at least one electronics carrier 4. According to the exemplary embodiment, and without limiting the invention, the carrier housing 2 is configured and designed not only for receiving the electronics carrier 4, but also for receiving a base carrier 5. The base carrier 5 is arranged between the electronics carrier 4 and the lock housing 1. In this context, the electronics carrier 4 can receive a control unit 11 and one or more energy sources or emergency energy sources 12. The base carrier 5 in turn serves for receiving and contacting one or more sensors 13.

It can be seen that the electronics carrier 4 and the base carrier 5 are electrically (and mechanically) coupled to one another via an electrical interface 14, 15. According to the exemplary embodiment, the electrical interface 14, 15 is composed of plug pins 14 on the base carrier 5 and an associated plug socket 15 on the electronics carrier 4. As soon as the plug pins 14 engage in the plug socket 15, the base carrier 5 and the electronics carrier 4 are joined with one another and are coupled to one another both mechanically and electrically. The carrier housing 2 and the electronics carrier 4 and/or the base carrier 5 define, overall, a pre-assembled structural unit 2, 4, 5. According to the invention, this structural unit 2, 4, 5 is then coupled to the lock housing 1, with at least one seal interposed 16—specifically, in a modular manner. In this context, the seal 16 ensures that the lock housing 1 and the carrier housing 2 are connected to one another in a media-tight manner and define the housing 1, 2 in the assembled state.

For this purpose, the seal 16 is a separately applied seal—for example, made of EPDM (ethylene propylene diene rubber). Of course, other elastomeric plastics such as NBR (acrylonitrile butadiene rubber), SBR (styrene butadiene rubber), and also natural rubber (NR) can be used at this point. In principle, the seal can also be designed as a multi-part component—for example, as a liquid seal with a curing agent. Furthermore, it is possible to glue the seal 16. A seal channel surrounding the lock housing 1 on the edge thereof may be provided for receiving the seal 16.

In all of these cases, the mechanical interface realized at this point between the structural unit 2, 4, 5 and the lock housing 1 is sealed in a media-tight manner by means of the seal 16, generally achieving the so-called IP protection class 67. The classification is carried out in accordance with DIN EN 60529 in such a way that, on the one hand, complete protection against contact (6) and, on the other, protection against water ingress during temporary immersion (approximately half an hour at up to 1 m depth) according to class 7 is ensured. This, of course, is only an example and is not restrictive.

As already explained, the carrier housing 2 and the electronics carrier 4 and/or the combination of the electronics carrier 4 and the base carrier 5 define the previously mentioned, pre-assembled structural unit 2, 4, 5, which in turn is coupled to the lock housing 1 with the seal 16 interposed—specifically, in a modular manner. This means that the mechanical interface between the carrier housing 2 and/or the structural unit 2, 4, 5 on the one hand, and the lock housing 1 on the other, is preserved, even if a differently designed carrier housing 2 is used at this point. This is the case, for example, if the "emergency power supply" already described in the introduction is not required, and, consequently, the additional energy source 12 or the several energy sources 12 on the electronics carrier 4 are not required. The same applies in the event that a differently constructed actuator 6, 7, 8 is accommodated in the interior of the lock housing 1—for example, one that has a gearing deviating from the gearing 7, which is, however, not shown in detail.

It can be seen that the electrical interface 14, 15 is arranged encapsulated within the structural unit 2, 4, 5, and is consequently protected against media influences. In addition, the sensors 13 generally operate in a contactless manner. As a result, the housing 1, 2 consisting of the carrier housing 2 and the lock housing 1 can be sealed, according to the illustration in FIG. 2, with respect to the lock plate 3. This seal can be seen in particular in FIG. 1, and it is embodied here in a seal 17. In fact, the seal 17 ensures that the locking-mechanism-side component 6, 7, 8 or the actuator 6, 7, 8 can be guided via the seal 17 in question to the outside of the lock housing 1. As a result, the locking-mechanism-side component and/or the actuator 6, 7, 8 can be brought into engagement with the locking mechanism 9, 10.

For this purpose, the seal 17 in the example is a bellows seal, because the control lever 8 specifically guided in this way performs a linear movement in its longitudinal direction. The seal 17 and/or the bellows seal can then easily follow any linear movements of the control lever 8. At the same time, the seal 17 ensures that the housing 1, 2 consisting of the lock housing 1 and the carrier housing 2 with the seal 17 interposed is formed as a whole to be hermetically sealed.

Figure 2:
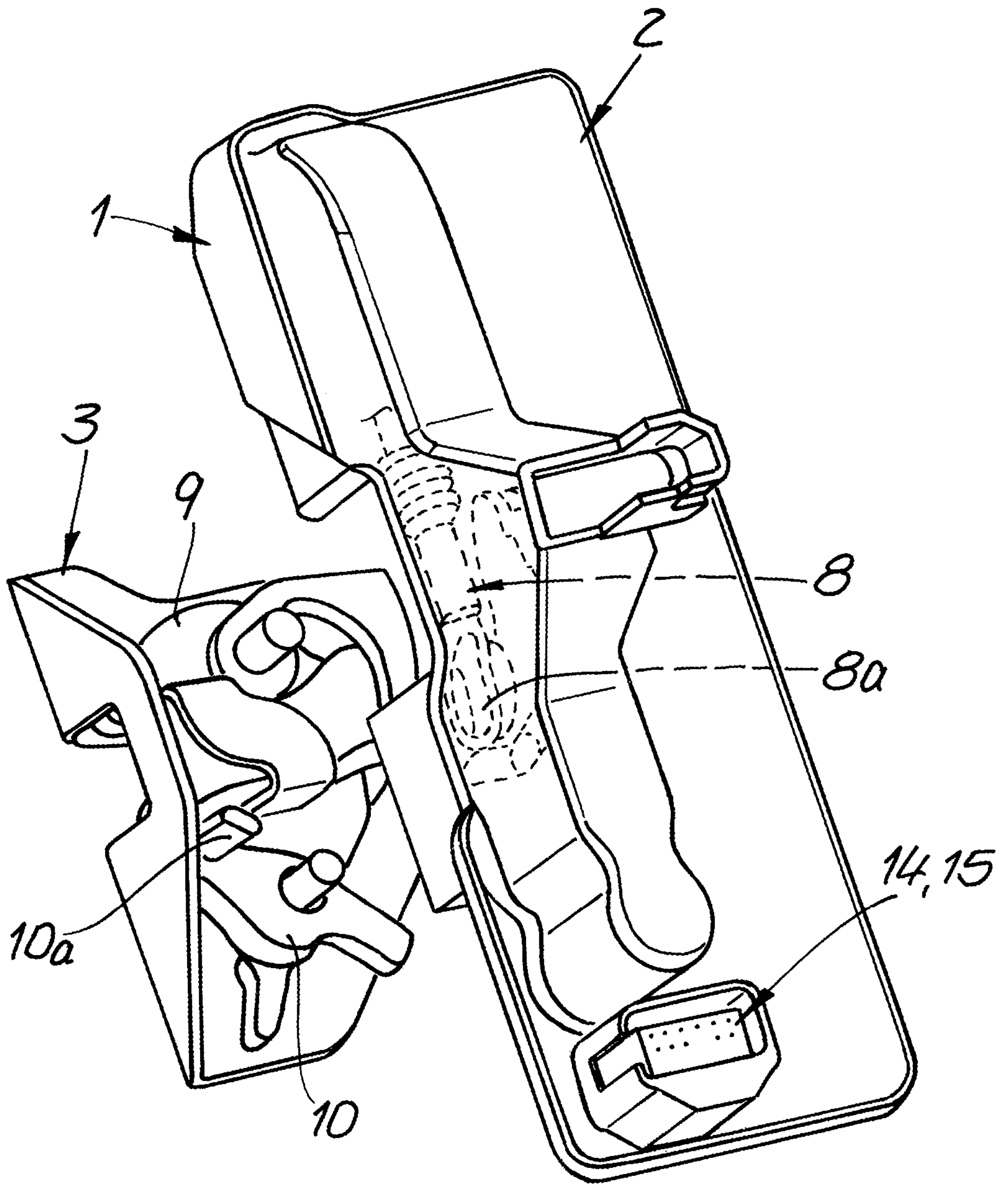
FIG. 2 shows a sub-step of bringing together the housing and the lock plate.
Figure 3:
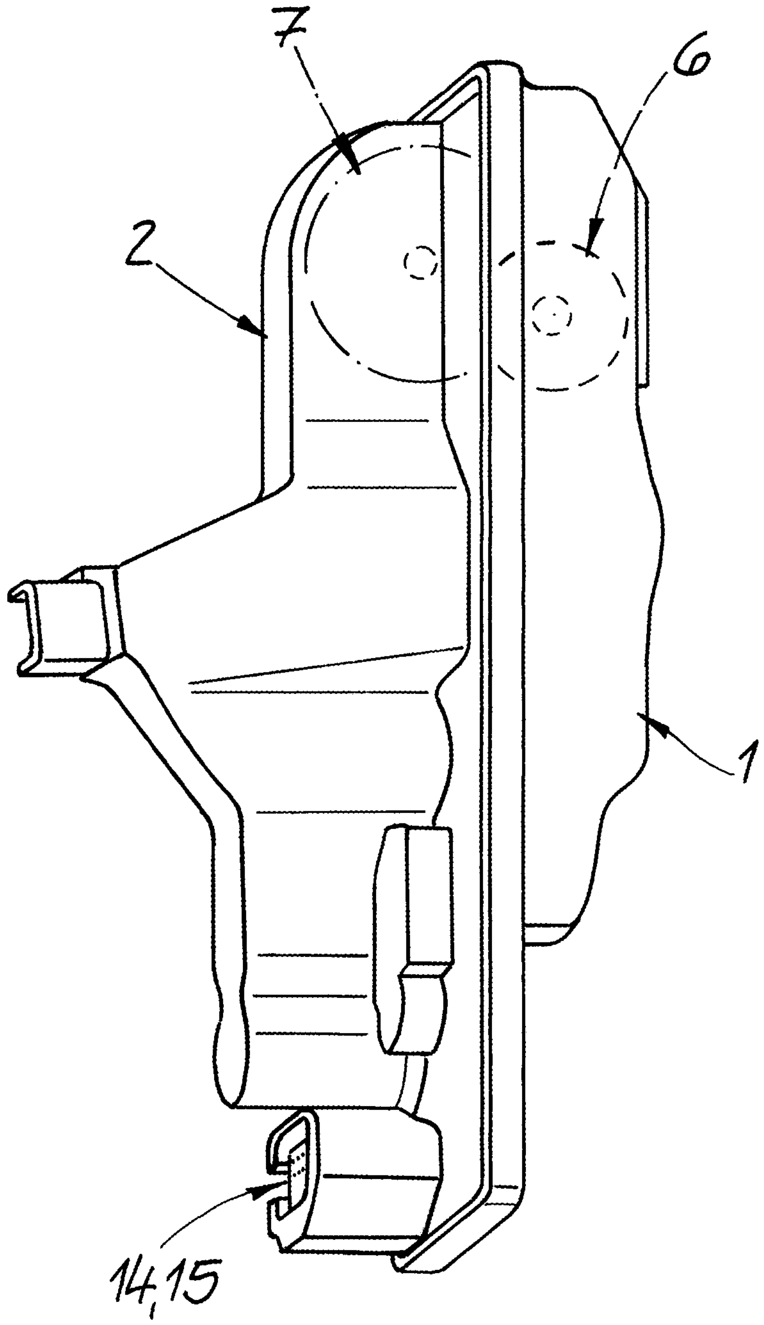
FIG. 3 is the motor vehicle lock housing arrangement in the assembled and ready-to-install state.

As soon as the housing 1, 2, corresponding to the illustration in FIG. 2, is then combined with the lock plate 3, the actuating pin 10*a* on the pawl 10 dips into the associated engagement opening 8*a* in the control lever 8, so that, in the assembled state of the example corresponding to the depiction in FIG. 3, the actuator 6, 7, 8 can open the locking mechanism 9, 10. Of course, this constitutes only one possible function. The actuator 6, 7, 8 could also function so as to generate a pulling movement or closing movement of the locking mechanism 9, 10.

Since, at this point, and moreover, the sensors 13 and/or the at least one sensor 13 accommodated in the interior of the housing 1, 2 operate in a contactless manner, any actuating movements of the actuator 6, 7, 8, and thus also of the locking mechanism 9, 10, can still be detected. For example, the sensor 13 may be a Hall sensor that detects the movements of corresponding permanent magnets. This does not change anything in the hermetically-sealed design of the housing 1, 2 with respect to the lock plate 3. Since the sensor or the sensors 13 are furthermore arranged on the base carrier 5, and the base carrier 5 is generally designed as an electrical component carrier, corresponding signals of the sensor 13 or of the several sensors 13 pass directly to the control unit 11 on the electronics carrier 4 via the electrical plug connection 14, 15, said signals actuating or being able to actuate the actuator 6, 7, 8, depending upon the signals of the sensor or the several sensors 13.

Like the carrier housing 2, the lock housing 1 is usually made of plastic. In fact, it is typically a plastic injection-molded component. In contrast, the lock plate 3 for mounting the locking mechanism 9, 10 is formed of solid metal and/or steel. In addition, it can be seen in a comparison of FIGS. 1 through 3 that the lock plate 3, in a side view, is designed in the manner of a bridge, and is accommodated in a corresponding receptacle adapted to the bridge shape in the interior of the housing 1, 2, such that an overall flat surface is provided at the outside, with the aid of which the lock plate 3 is mounted, for example, in the interior of a motor vehicle door.

LIST OF REFERENCE SIGNS

1 Lock housing
1, 2 Housing
2 Carrier housing
2, 4, 5 Structural unit
3 Lock plate
4 Electronics carrier
5 Base carrier
6 Electric motor
6, 7, 8 Locking-mechanism-side component, actuator
7 Gearing
8 Control lever
8*a* Engagement opening
9 Catch
9, 10 Locking mechanism
10 Pawl
10*a* Actuating pin
11 Control unit
12 Energy source, emergency energy source
13 Sensor
14 Plug pins
14, 15 Electrical interface, plug connection
15 Plug socket
16 Seal
17 Seal

The invention claimed is:

1. A motor vehicle lock housing arrangement comprising:
   at least one lock housing and at least one carrier housing, wherein the lock housing receives at least one locking-mechanism-side component that interacts with a locking mechanism,
   wherein the carrier housing receives at least one electronics carrier including at least one electronics component,
   wherein the lock housing and the carrier housing are connected together in a media-tight manner,
   wherein the carrier housing and the electronics carrier define a pre-assembled structural unit which is coupled modularly to the lock housing,
   wherein the pre-assembled structural unit additionally has a base carrier, wherein the base carrier is arranged between the electronics carrier and the lock housing, at least one seal interposed between the lock housing and the carrier housing, wherein the at least one seal directly engages the lock housing and the carrier housing to connect the lock housing and the carrier housing in the media-tight manner, further comprising a lock plate on which the locking mechanism is mounted, the lock plate is modularly connected to a housing comprising the lock housing and the carrier housing, and, a second seal that seals the housing with respect to the lock plate.

2. The motor vehicle lock housing arrangement according to claim 1, wherein the base carrier and the electronics carrier are coupled to one another via an electrical interface.

3. The motor vehicle lock housing arrangement according to claim 2, wherein the electrical interface is arranged encapsulated within the structural unit.

4. The motor vehicle lock housing arrangement according to claim 2, wherein the electrical interface is an electrical plug connection.

5. The motor vehicle lock housing arrangement according to claim 1, wherein the base carrier is an electrical component carrier that receives at least one sensor, and the sensor is configured to work in a contactless manner.

6. The motor vehicle lock housing arrangement according to claim 1, wherein a locking-mechanism-side component of the at least one locking-mechanism-side component extends from inside the lock housing to an outside of the lock housing for engagement with the locking mechanism, wherein the locking-mechanism-side component of the at least one locking-mechanism-side component is sealed from the outside via the second seal.

7. The motor vehicle lock housing arrangement according to claim 1, wherein the least one locking-mechanism-side component is an actuator.

8. The motor vehicle lock housing arrangement according to claim 1, wherein the at least one electronics component includes an energy source.

9. The motor vehicle lock housing arrangement according to claim 1, wherein the at least one locking-mechanism-side component includes one or more of an electronic motor, gearing, and a control lever.

10. The motor vehicle lock housing arrangement according to claim 1, wherein the lock housing includes a seal channel for receiving the seal.

11. The motor vehicle lock housing arrangement according to claim 1, wherein the second seal is a bellows seal.

12. A motor vehicle lock housing arrangement comprising:

at least one lock housing and at least one carrier housing, wherein the lock housing receives at least one locking-mechanism-side component that interacts with a locking mechanism, wherein the carrier housing receives at least one electronics carrier including at least one electronics component, wherein the lock housing and the carrier housing are connected together in a media-tight manner, wherein the carrier housing and the electronics carrier define a pre-assembled structural unit which is coupled modularly to the lock housing, at least one seal interposed between the lock housing and the carrier housing, further comprising a lock plate on which the locking mechanism is mounted, wherein the lock plate is modularly connected to a housing comprising the lock housing and the carrier housing, and further comprising a second seal that seals the housing with respect to the lock plate.

13. The motor vehicle lock housing arrangement according to claim 12, wherein a locking-mechanism-side component of the at least one locking-mechanism-side component extends from inside the lock housing to an outside of the lock housing for engagement with the locking mechanism, wherein the locking-mechanism-side component of the at least one locking-mechanism-side component is sealed from the outside via the second seal.

14. The motor vehicle lock housing arrangement according to claim 12, wherein the second seal is a bellows seal.

* * * * *